(12) United States Patent
Bunod et al.

(10) Patent No.: US 8,807,520 B2
(45) Date of Patent: Aug. 19, 2014

(54) SYSTEM AND METHOD FOR CONTROLLING FLOW IN A PLURALITY OF VALVES

(75) Inventors: Ludovic Bunod, Bavilliers (FR); Guy Schermesser, Feldkirch (FR)

(73) Assignee: General Electric Company, Schenectady, NY (US)

( * ) Notice: Subject to any disclaimer, the term of this patent is extended or adjusted under 35 U.S.C. 154(b) by 62 days.

(21) Appl. No.: 13/468,621

(22) Filed: May 10, 2012

(65) Prior Publication Data

US 2012/0318363 A1    Dec. 20, 2012

Related U.S. Application Data

(63) Continuation-in-part of application No. 13/467,939, filed on May 9, 2012.

(30) Foreign Application Priority Data

Jun. 15, 2011 (FR) ..................... 11 55196

(51) Int. Cl.
*F16K 35/00*    (2006.01)

(52) U.S. Cl.
USPC .......................... 251/101; 251/292

(58) Field of Classification Search
USPC ............ 251/90, 101, 231, 291, 292; 137/240; 60/363, 453; 422/194; 134/22.18, 23
See application file for complete search history.

(56) References Cited

U.S. PATENT DOCUMENTS

| | | | | |
|---|---|---|---|---|
| 339,440 A | | 4/1886 | Libby | |
| 1,550,108 A | * | 8/1925 | Sheafe | 251/98 |
| 3,744,752 A | * | 7/1973 | Massey | 251/292 |
| 3,858,843 A | * | 1/1975 | Hartmann | 251/99 |
| 3,960,168 A | * | 6/1976 | Plympton | 137/385 |
| 4,126,023 A | * | 11/1978 | Smith et al. | 70/177 |
| 4,193,579 A | * | 3/1980 | Massey | 251/288 |
| 4,203,572 A | * | 5/1980 | Coffman | 251/95 |
| 4,246,115 A | | 1/1981 | Swank | |
| 4,258,940 A | | 3/1981 | Fudge | |
| 4,559,966 A | * | 12/1985 | Massey et al. | 137/270 |
| 4,682,755 A | * | 7/1987 | Bernstein et al. | 251/4 |
| 4,770,388 A | * | 9/1988 | Carman | 251/95 |
| 4,848,724 A | * | 7/1989 | Pettinaroli | 251/95 |
| 4,909,275 A | * | 3/1990 | Massey et al. | 137/385 |
| 5,052,655 A | * | 10/1991 | Ackroyd | 251/95 |
| 5,183,073 A | * | 2/1993 | Roberts | 137/385 |
| 5,323,805 A | * | 6/1994 | Scaramucci | 137/385 |
| 5,368,066 A | * | 11/1994 | Scaramucci | 137/383 |

(Continued)

FOREIGN PATENT DOCUMENTS

WO    WO 9602783 A1 *    2/1996

*Primary Examiner* — John K Fristoe, Jr.
*Assistant Examiner* — Umashankar Venkatesan
(74) *Attorney, Agent, or Firm* — Fletcher Yoder, P.C.

(57) ABSTRACT

A system includes a set of valves and a handle, in which one valve in the set of valves is to be open at one time, and the handle is configured to move the valve between an open position and a closed position. The handle is configured to engage and disengage with the valve only when the valve is in the closed position such that the handle is not removed from the valve when the valve is in the open position. Thus, the system facilitates the sequential opening of valves in a set of valves by generally allowing a limited number of valves to be open at one time.

17 Claims, 3 Drawing Sheets

(56) References Cited

U.S. PATENT DOCUMENTS

| | | | |
|---|---|---|---|
| 5,579,804 A * | 12/1996 | Roberts | 137/385 |
| 5,647,389 A * | 7/1997 | Holloway | 137/15.24 |
| 6,073,637 A * | 6/2000 | Hayward et al. | 134/22.1 |
| 6,793,250 B2 * | 9/2004 | Stobart | 280/838 |
| 7,185,663 B2 * | 3/2007 | Koch et al. | 134/22.19 |
| 7,610,931 B2 * | 11/2009 | Wittig et al. | 137/551 |
| 2009/0261280 A1 * | 10/2009 | Matsushita et al. | 251/101 |
| 2011/0197923 A1 * | 8/2011 | Battaglioli et al. | 134/18 |

* cited by examiner

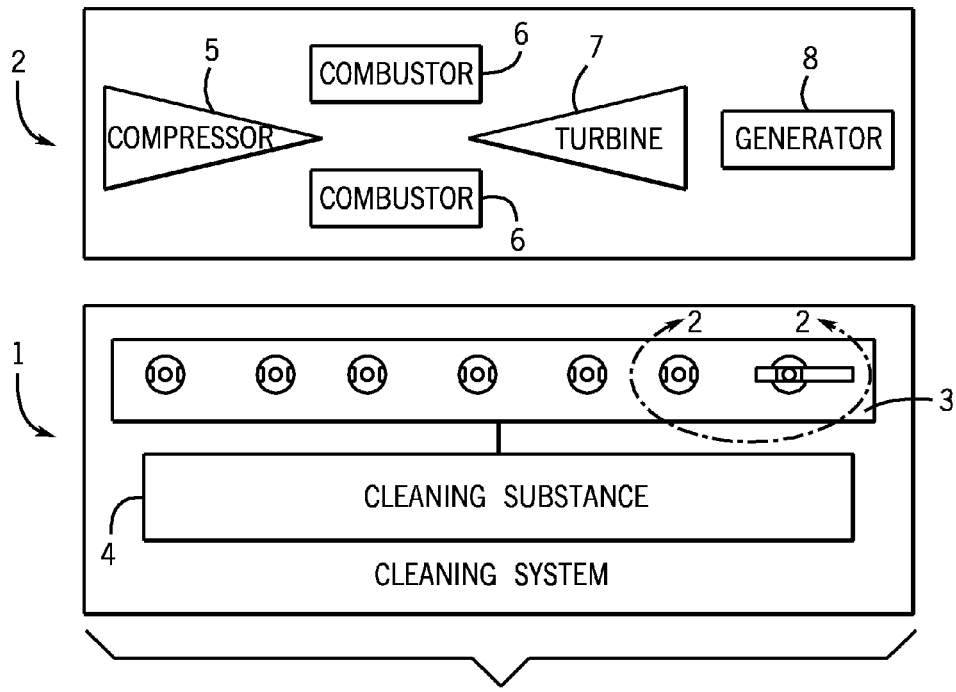
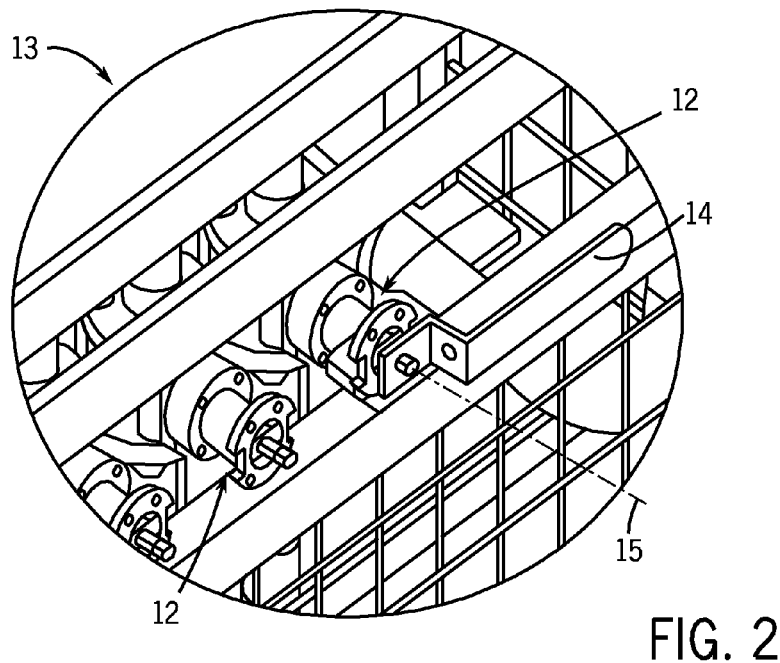

SYSTEM AND METHOD FOR CONTROLLING FLOW IN A PLURALITY OF VALVES

CROSS-REFERENCE TO RELATED APPLICATIONS

This application claims priority to and the benefit of French Patent Application No. 1155196, entitled "CONTROL DEVICE FOR VALVE AND VALVE EQUIPPED WITH SUCH A CONTROL DEVICE", filed Jun. 15, 2011, which is herein incorporated by reference in its entirety. This application is a continuation in part of U.S. patent application Ser. No. 13/467,939, entitled "CONTROL DEVICE FOR VALVE AND VALVE EQUIPPED WITH SUCH CONTROL DEVICE", filed May 9, 2012, which is herein incorporated by reference in its entirety, and which claims priority to and the benefit of French Patent Application No. 1155196, entitled "CONTROL DEVICE FOR VALVE AND VALVE EQUIPPED WITH SUCH A CONTROL DEVICE", filed Jun. 15, 2011, which is herein incorporated by reference in its entirety.

BACKGROUND OF THE INVENTION

Thermal powerplants that produce electricity generally comprise a turbine powered by fuel, such as fuel oil, and can comprise several combustion chambers. The performance of a powerplant can deteriorate over time for various reasons. In the first place, the aging of the facility itself can result in the deterioration of powerplant performance. Corrosion can also influence thermal powerplant performance. Additionally, the fouling of the compressor and, in particular, the stages of the turbine can have a relatively significant impact on performance of the powerplant. The fouling of the compressor may be particularly liable for causing a reduction in the usable cross-section of the turbine and a deterioration of its aerodynamic characteristics.

The type of fuel oil used has a relatively significant impact on the fouling of the turbine, particularly of its first stages. During combustion of heavy fuel oil, this fouling phenomenon is exacerbated such that the turbine stages are cleaned on a regular basis. Cleaning can be carried out when the machine is shut down by injecting water combined with a detergent onto the surfaces of the turbine stages. Another method is to perform the cleaning when the machine is in operation by injecting an abrasive product into the combustion chambers that is then carried by the hot gases through the turbine stages. A product is chosen that will be destroyed by combustion, releasing nothing but smoke that is evacuated by the exhaust gases of the turbine. The injection generally consists of using pressurized air, for example at 26 bars, and at a temperature of about 200° C., and is extracted as it is discharged from the turbine compressor.

Cleaning performed during operation of the machine is generally termed "on-line" cleaning. A specific module is used to load the abrasive product into a tank, place the tank under pressure and convey the product to the different combustion chambers. Conveying of the product may be done sequentially in order to avoid disturbing the combustion and ensure that the chambers are fed an identical quantity of product.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment of the present disclosure, a system includes a plurality of valves, and a handle configured to engage with one of the plurality of valves at a time. Each of the plurality of valves is configured to move between an open position and a closed position when the handle is engaged with the valve. The handle is engageable and disengageable with each of the plurality of valves only when the valve is in the closed position or engageable and disengageable with each of the plurality of valves only when the valve is in the open position. In another embodiment, a system includes a valve and a handle configured to move the valve between open and closed positions, wherein the handle is configured to engage and disengage with the valve in only one position of the valve.

In another embodiment, a method includes controlling actuation of a plurality of valves via a limited number of handles, wherein the limited number is less than the plurality of valves, each handle is configured to interlock with each valve in a first position of the valve, each handle is configured to move each valve between the first position and a second position of the valve while interlocked with the valve, and each handle is configured to unlock from each valve in the first position of the valve.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 1 is a representative view of a valve system, in accordance with aspects of the present disclosure;

FIG. 2 is a detailed view of a valve and a handle taken within line 2-2 of FIG. 1, in accordance with aspects of the present disclosure;

DETAILED DESCRIPTION OF THE INVENTION

Figure 3:
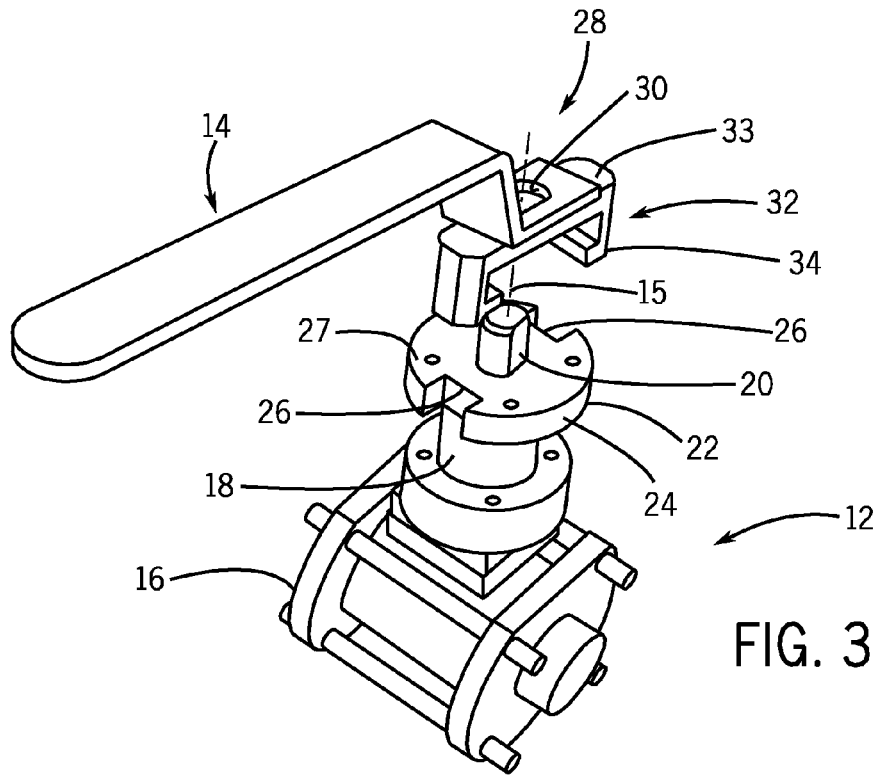
FIG. 3 is a perspective view of a valve and a handle, in which the handle is disengaged from the valve and the valve is in a closed position, in accordance with aspects of the present disclosure.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

When performing on-line cleaning of a valve system, the valves are generally opened and closed one after the other in such a way that no two valves are open simultaneously. Consequently, the operation of opening and closing the valves to convey the cleaning product involves numerous successive manual opening and closing operations. Such operations can result in handling errors without the enclosed embodiments. For example, an operator may not close one valve before opening another valve, resulting in more than one valve at once, which is undesirable. In view of the foregoing, the present disclosure provides a system that makes it possible to prevent any mishandling, and in particular, to prevent the simultaneous opening of multiple valves intended to be controlled sequentially (i.e., one at a time).

Turning now to the figures, FIG. 1 is a schematic of a system having a cleaning system 1 coupled to a machine (e.g., a gas turbine engine) 2, wherein the cleaning system 1 is configured to clean one or more portions of the machine 2. The cleaning system 1 includes a valve system 3 coupled to a supply of cleaning substance 4. The gas turbine engine 2 includes a compressor 5, a plurality of combustors 6 (e.g., 2 to 20 or more), a turbine 7, and an electrical generator 8. In certain embodiments, the cleaning system 1 uses the valve system 3 to selectively deliver the cleaning substance 4 to a limited number of portions (e.g., combustors 6) of the gas turbine engine 2 during operation of the engine 2. For example, the valve system 3 includes a plurality of valves 12 controlled by a handle 14, wherein each valve 12 is configured to deliver the cleaning substance 4 to one of the portions (e.g., combustors 6), and the system 3 includes a limited number of handles 14 (e.g., 1, 2, or 3) to restrict actuation of the valves 12 to the limited number during operation of the engine 2.

Generally, each valve 12 of the valve system 3 is to be opened sequentially, or one at a time, such that no two valves 12 are open at the same time. This may be the case when the valve system 3 or the system that the valve system 3 is coupled to (e.g., combustion chambers) is undergoing on-line cleaning or another process in which no more than one valve is to be open at a time. The illustrated valve system 3 is coupled to the combustion chambers (e.g., turbine combustors 6) of the turbine engine 2 driving the generator 8 in a power plant. However, the valve system 3 may be used in a wide range of applications, including nuclear plants, marine operations, plastics processing, and so forth.

FIG. 2 illustrates a detailed view 13 of the valve system 3 taken within line 2-2 of FIG. 1, which includes a valve 12 and a handle 14 (e.g., control device). In this figure, the handle 14 is shown to be engaged with the valve 12. The handle 14 is configured to engage with one of the valves 12 at a time. The handle 14, when engaged with one of the valves 12, may move the valve into an open position by rotating about a center axis 15 of the valve 12. The handle 14 may be configured to rotate 90° in either direction to open the valve 12, depending on the configuration of the valve 12. Alternatively, the handle 14 may be configured to rotate 45°, 180°, etc., to open the valve 12. When the handle 14 and the valve 12 are in the open valve position, the handle 14 is essentially locked onto the valve 12, and the handle 14 generally cannot be removed from the valve 12 until the handle 14 and valve 12 are moved back into a closed position.

In certain embodiments in which only one valve 12 of the plurality of valves 12 is to be open at a time, the valve system 3 may only include one handle 14. This means that only one handle 14 is to be used with the valve system 3 during operation. However, spare handles may be included, but not used. Also, even though only one handle 14 is to be used during operation, the valve system 3 described herein may be configured such that it is disengaged from the handle 14. In other words, the disclosed valve system 3 and the handle 14 may not always be used together, or may be kept separately.

The valve 12 and handle 14 are further detailed in FIG. 3, in which the handle 14 is disengaged from the valve 12 and the valve 12 is in the closed position. In the illustrated embodiment, the valve 12 includes a valve body 16 which is coupled to a raised extension 18 and a control rod 20. Generally, the control rod 20 may be configured to be rotated about its axis 15. Opening and closing of the valve 12 may be controlled through rotation of the control rod 20. For example, in certain embodiments, the valve 12 may be put into the open position when the control rod 20 is rotated a certain way from a neutral position, and the valve 12 may be put back into a closed position when the control rod 20 is turned back to the neutral position.

The valve 12 also includes a locking mechanism 22, which in the illustrated embodiment, includes a flanged locking disk 24. The flanged locking disk 24 includes two notches 26 or recesses, which allow the handle 14 to engage with and disengage from the valve 12 when the valve is in the closed position, and two flanges 27 configured to block the handle 14 from disengaging from the valve 12 when the valve 12 is in the open position.

Accordingly, the handle 14 includes an operating end 28, which includes an opening 30 configured to be disposed around the control rod 20. The opening 30 is generally shaped like the control rod 20. The opening 30 and the control rod 20 are generally non-circular (e.g., having opposing curved portions and opposing flat portions). The control rod 20 and the opening 30 are configured such that when coupled together, rotation of the opening 30 via the handle 14 results in rotation of the control rod 20 in a similar manner. As such, the handle 14, when coupled to the rod 20, may be rotated to move the valve 12 between the closed position and the open position. The operating end 28 of the handle 14 also includes a locking feature 32 configured to engage with the locking mechanism 24 of the valve 12. In the illustrated embodiment, the locking feature 32 includes a crossbar 33 with two downwardly extended ledges 34 (e.g. hook portions or radial pins) whose shapes are complementary to the notches 26. The ledges 34 are formed on opposing sides of the opening 30, and face each other at shown. The ledges 34 are configured to be disposed in the notches 26 of the locking mechanism such that the opening 30 is simultaneously disposed around the control rod 26.

Figure 4:
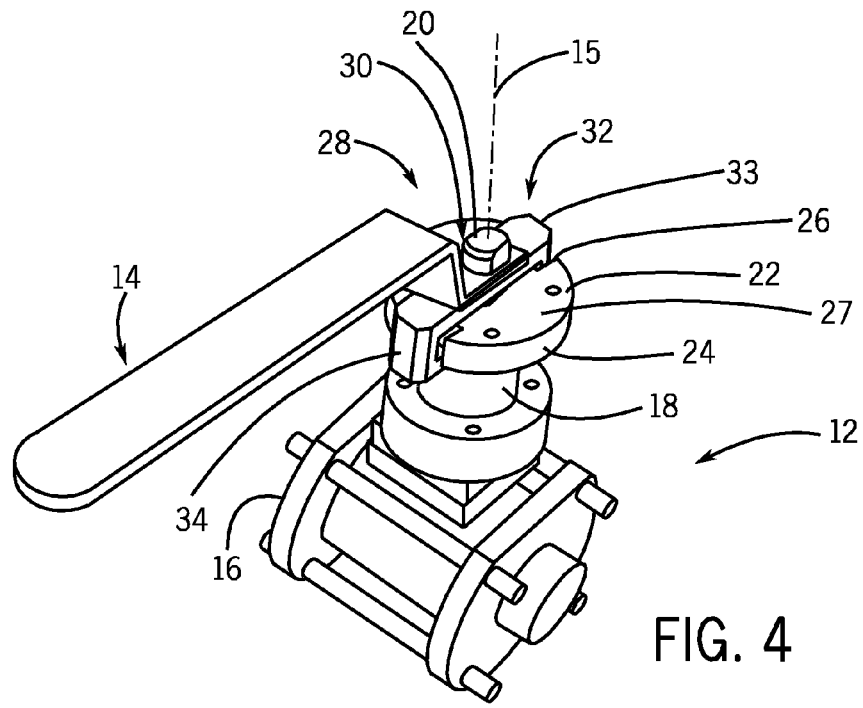
FIG. 4 is a perspective view of the valve and handle of FIG. 1, in which the handle is engaged with the valve and the valve is in the closed position, in accordance with aspects of the present disclosure.
Figure 5:
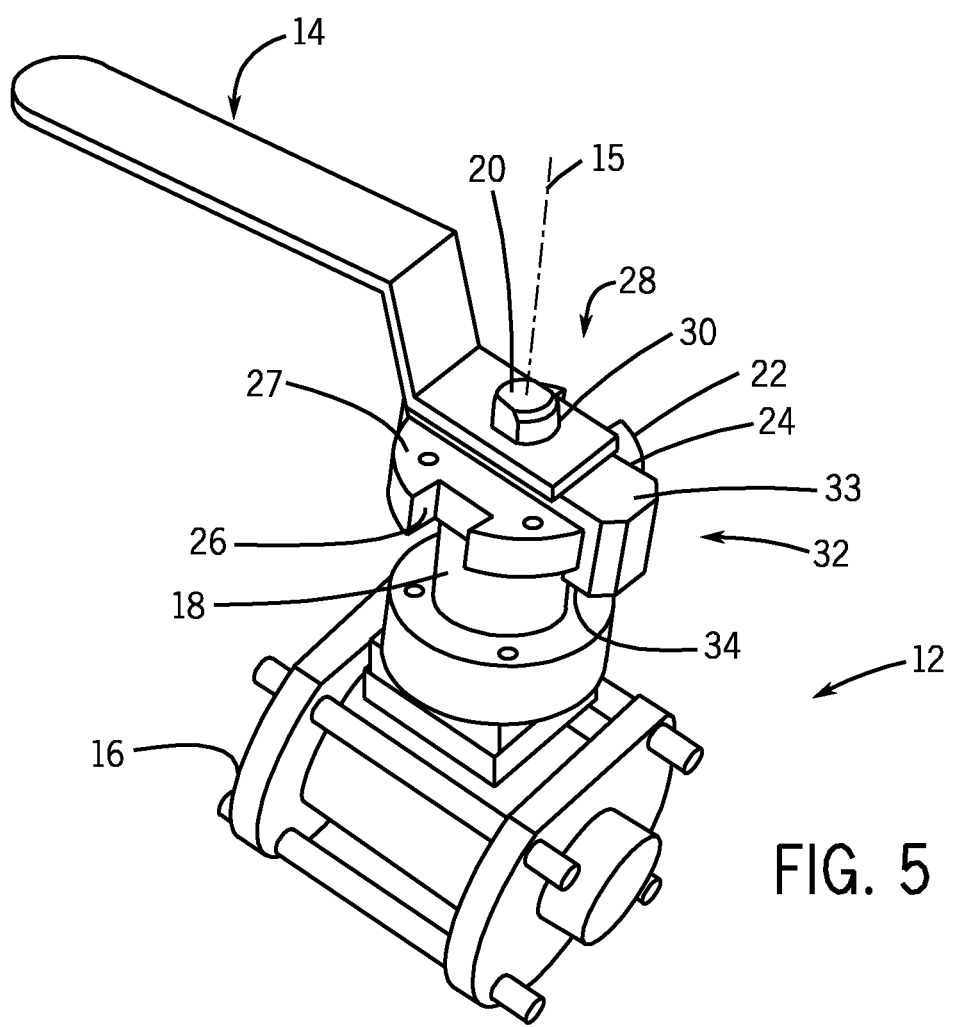
FIG. 5 is a perspective view of the valve and handle of FIGS. 1 and 2, in which the handle is engaged with the valve and the valve is in an open position, in accordance with aspects of the present disclosure.

FIG. 4 illustrates the handle 14 and valve 12 in such a fully installed configuration. Generally, the ledges 34 extend downwardly from the crossbar 33 at least as far as the thickness of the flanged locking disk 24, such that the flanged locking disk 24 is able to fit between the ledges 34 and the crossbar 33. When fully installed with the valve 12, the handle 14 may be rotated or turned about the axis 15, thereby turning the control rod 20 and moving the valve 12 into the open position. In the illustrated embodiment, when the handle 14 is turned about the axis 15, the operating end 28 rotates such that the ledges 34 are moved to be disposed under the flanges 27 rather than in the notches 26. This configuration is illustrated in FIG. 5. Accordingly, when the ledges 34 are disposed under the flanges 27, as shown in FIG. 5, the handle 14 is considered to be locked, and generally not removable from the valve 12. Generally, FIG. 4 shows the closed position of the valve, and FIG. 5 shows the open position of the valve. Additionally, in certain embodiments, it should be understood that FIG. 4 may be considered to show the handle 14 relative to the valve 12 in the open position, and FIG. 5 may be considered to show the handle 14 relative to the valve 12 in the closed position, as discussed in more detail below.

The handle 14 is generally not available to be used to open a second valve 12 when it is locked onto a first valve 12 in the configuration discussed above and illustrated in FIG. 5. This prevents the opening of more than one valve 12 at a time assuming that the one handle 14 is used for multiple valves 12. In order to open a second valve 12, the first valve 12 is returned to the closed positioned (FIG. 4) by the handle 14. When the valve 12 and handle 14 are turned to the closed position, as illustrated in FIG. 3, the ledges 34 of the handle 14 generally line up with the notches 26 in the flanged locking disk 24. The handle 14 may then be disengaged from the valve 12, as illustrated in FIG. 2. Thus, the handle 14 may be moved to engage with and open another valve 12. This may be repeated for all the valves 12 in the valve system 3.

In certain embodiments, the valve system 3 may allow a predetermined number of valves 12 to be open at once, the predetermined number being one or more than one (e.g. 2, 3, 4, 5, or more). In such embodiments, the valve system 3 may include the predetermined number of handles 14 that may be used with the system at once. For instance, the valve system 3 may allow three valves 12 to be open to once. As such, the valve system 3 may include three handles 14, each of which may be engaged with a valve 12 and be configured to open the valve 12 without removing any of the other two handles 14. Thus, in this example, a maximum of three valves 12 may be open at one time.

As noted above, in certain embodiments, the valve system 3 may be configured such that all the valves 12 are generally in the open position by default, and only a predetermined number of valves 12 may be closed at the same time. In such embodiments, the locking mechanism 22 of the valve 12 and the locking feature 32 of the handle may be configured such that the handle 14 can only be engaged and disengaged from the valve 12 when the valve 12 is in the open position, and the handle 14 cannot be removed from a valve 12 when the valve 12 is in the closed position. Accordingly, in certain embodiments, FIGS. 3-4 may be considered to depict engagement of the valve 12 by the handle 14 when the valve 12 is in an open position, while FIG. 5 may be considered to depict the handle 14 relative to the valve 12 when the valve 12 is in a closed position, and the handle 14 cannot be removed from the valve 12 in the closed position.

It should be noted that the exact configuration of the locking mechanism 22 of the valve 12, such as the flanged locking disk 24, and the configuration of the locking feature 32 of the handle 14, such as the crossbar 33 and ledges 34, may be uniquely configured such that only the handle 14 is capable of opening the corresponding valves 12 or valve system 3. For example, a power plant may have several different valve systems 10, in which only one valve 12 in each valve system 3 is to be open at one time. These different valve systems 10 may each include a uniquely configured locking mechanism 22 and corresponding handle 14 such that the handle 14 of one system does not open the valves 12 of a different valve system 3. This differentiation may be implemented by varying the sizes of the control rod 20 and opening 30 and/or the thickness of the flanged locking disk 24 and ledge 34 distance. For instance, a handle 14 of one system may be configured to have an opening 30 that does not fit onto than the control rod 20 of another system, or the handle 14 of one system may have a ledge 34 distance shorter than the thickness of the flanged locking disk 24 of another system. Thus, the valves 12 may be blocked from being operated on by the wrong handle 14.

It can therefore be seen that, through the use of the locking mechanism 22 and handle 14 on the valve 12, which allow the handle 14 to be disengaged from the valve 12 only when the valve 12 is in the desired position (e.g., closed position), it is generally guaranteed that when one valve 12 is in the open position, it is generally not possible for multiple valves to be open simultaneously. Moreover, it should be noted that this objective is achieved by using a handle 14 and locking mechanism 22 of particularly simple, compact, and inexpensive structure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system comprising:
a valve; and
a handle configured to move the valve between open and closed positions, wherein the handle is configured to engage and disengage with the valve by moving the handle in an axial direction relative to a rotational axis of the valve, wherein the handle is configured to engage and disengage with the valve in only one of the open or closed positions of the valve, wherein a locking mechanism of the valve comprises a flange having at least one slot extending between a first surface and a second surface of the flange in the axial direction, and a locking feature of the handle comprises at least one hook configured to extend through the at least one slot and catch on the second surface of the flange while the handle is moved between the open position and the closed position.

2. A method, comprising:
controlling actuation of a plurality of valves via a limited number of handles, wherein the limited number is less than the plurality, each handle is configured to be applied to the valve in an axial direction with respect to a rotational axis of the valve only when the valve is in one of a closed position or an open position, and each handle comprises multiple locking features configured to interlock with each valve as each handle moves each valve between the closed position and the open position of the valve, and each handle is configured to separate from each valve by moving the handle in the axial direction only when the valve is in one of the closed position or the open position of the valve.

3. The method of claim 2, comprising controlling flow of a cleaner to a plurality of combustion chambers during operation of a combustion system via the limited number of handles actuating the valves, wherein each valve controls the flow of the cleaner to one of the plurality of combustion chambers.

4. The method of claim 2, wherein the multiple locking features block separation of the handle from the valve as the handle moves each valve between the closed position and the open position.

5. A system comprising:
a cleaning system, comprising:
a first number of valves configured to control a flow of a cleaner to a plurality of portions of a machine during operation of the machine; and
a second number of handles, each handle of the second number of handles being configured to move the valves between open and closed positions, wherein each handle of the second number of handles is configured to engage and disengage with each valve of the first number of valves by moving the handle in an axial direction relative to a rotational axis of the valve, wherein each handle of the second number of handles is configured to engage and disengage with each valve of the first number of valves in only one of the open or closed positions of the valve, wherein the second number is less than the first number, and the second number of handles is configured to limit actuation of the valves to only the second number of the valves at a time.

6. The system of claim 5, wherein each valve of the first number of valves controls the flow of the cleaner to one of the plurality of portions, and each valve of the first number of valves is normally in the closed position while the handle is not coupled to the valve.

7. The system of claim 5, comprising the machine having the plurality of portions.

8. The system of claim 7, wherein the plurality of portions comprise a plurality of combustion chambers.

9. A cleaning system for controlling a flow of a cleaner, comprising:
a first number of valves configured to control the flow of the cleaner to a plurality of portions of a machine during operation of the machine; and
a second number of handles, wherein the second number is less than the first number, and wherein each handle is configured to engage with only one of the valves at a time such that the second number of handles is configured to limit engagement of the valves to only the second number of the valves at a time;
wherein each valve of the first number of valves is configured to move between an open position and a closed position when a handle of the second number of handles is engaged with the valve;
wherein the handle is engagable and disengageable with each valve of the first number of valves only when the valve is in the closed position or the handle is engageable and disengageable with each valve of the first number of valves only when the valve is in the open position;
wherein each valve of the first number of valves comprises a locking mechanism configured to engage and disengage with a locking feature of the handle in only one of the open or closed positions;
wherein the locking mechanism comprises a flange having at least one slot extending between a first surface and a second surface of the flange in an axial direction relative to a rotational axis of the valve, and the locking feature comprises at least one hook configured to extend through the at least one slot and catch on the second surface of the flange when the handle is rotated between the open position and the closed position.

10. The system of claim 9, wherein the locking feature and the locking mechanism are configured to enable engagement and disengagement of the handle with each valve of the first number of valves when the valve is in the closed position, and the locking feature and the locking mechanism are configured to block engagement and disengagement of the handle with the valve when the valve is in the open position.

11. The system of claim 9, wherein the locking feature and the locking mechanism are configured to enable engagement and disengagement of the handle with each valve of the first number of valves when the valve is in the open position, and the locking feature and the locking mechanism are configured to block engagement and disengagement of the handle with the valve when the valve is in the closed position.

12. The system of claim 9, wherein the at least one slot comprises opposing first and second slots in the flange, and the at least one hook comprises opposing first and second hooks.

13. The system of claim 12, wherein the first hook comprises a first protrusion and the second hook comprises a second protrusion, and wherein the first and second protrusions extend radially toward each other.

14. The system of claim 9, wherein the system includes only a single one of the handle to limit actuation of the first number of valves to only one valve at a time.

15. The system of claim 9, wherein the cleaning system is configured to clean a plurality of combustion chambers of a combustion system during operation of the combustion system, wherein each valve of the first number of valves controls the flow of the cleaner to one of the plurality of combustion chambers, and each valve of the first number of valves is normally in the closed position while the handle is not coupled to the valve.

16. The system of claim 15, comprising the combustion system having the plurality of combustion chambers.

17. The system of claim 16, wherein the combustion system comprises a gas turbine engine.

* * * * *